United States Patent
Paolini, Jr. et al.

(10) Patent No.: US 8,873,129 B2
(45) Date of Patent: Oct. 28, 2014

(54) TETRACHROMATIC COLOR FILTER ARRAY FOR REFLECTIVE DISPLAY

(75) Inventors: Richard J. Paolini, Jr., Framingham, MA (US); Stephen J. Telfer, Arlington, MA (US); Alain Bouchard, Dorchester, MA (US); John Atkinson, Somerville, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 13/439,404

(22) Filed: Apr. 4, 2012

(65) Prior Publication Data

US 2012/0257269 A1 Oct. 11, 2012

Related U.S. Application Data (60) Provisional application No. 61/472,690, filed on Apr. 7, 2011.

(51) Int. Cl.
| | |
|---|---|
| G02B 26/00 | (2006.01) |
| G02B 26/08 | (2006.01) |
| G02F 1/29 | (2006.01) |
| G02F 1/1335 | (2006.01) |
| G02F 1/167 | (2006.01) |
| G02B 5/22 | (2006.01) |
| G02B 5/20 | (2006.01) |

(52) U.S. Cl.
CPC ............ *G02B 5/22* (2013.01); *G02F 1/133514* (2013.01); *G02F 1/167* (2013.01); *G02F 2203/055* (2013.01); *G02B 5/201* (2013.01)
USPC .......................................... 359/296; 359/298

(58) Field of Classification Search
USPC ......... 359/237, 242, 290–292, 295, 298, 267, 359/268, 491.01; 353/84
See application file for complete search history.

(56) References Cited

U.S. PATENT DOCUMENTS

| | | |
|---|---|---|
| 4,418,346 A | 11/1983 | Batchelder |
| 4,670,777 A | 6/1987 | Ishikawa et al. |
| 5,642,176 A | 6/1997 | Abukawa et al. |
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II et al. |
| 6,017,584 A | 1/2000 | Albert et al. |
| 6,054,071 A | 4/2000 | Mikkelsen, Jr. |
| 6,055,091 A | 4/2000 | Sheridon et al. |
| 6,097,531 A | 8/2000 | Sheridon |
| 6,128,124 A | 10/2000 | Silverman |

(Continued)

OTHER PUBLICATIONS

Bach, U., et al., "Nanomaterials-Based Electrochromics for Paper-Quality Displays", Adv. Mater, 14(11), 845 (2002).

(Continued)

*Primary Examiner* — Thomas K Pham
*Assistant Examiner* — Brandi Thomas
(74) *Attorney, Agent, or Firm* — David J. Cole (57) ABSTRACT

A tetrachromatic color filter array comprises multiple pixels, each of which comprises first, second, third and fourth sub-pixels having first, second, third and fourth hues, P1, P2, P3 and P4 respectively, these first, second, third and fourth hues having first, second and third hue angles, h1, h2, h3 and h4 respectively. The hues of the sub-pixels such that h3 equals $h1+(180°\pm10°)$ and h4 equals $h2+(180°\pm10°)$ in the $a^*b^*$ plane of the $La^*b^*$ color space.

18 Claims, 9 Drawing Sheets

(56) References Cited

U.S. PATENT DOCUMENTS

| | | | |
|---|---|---|---|
| 6,130,774 | A | 10/2000 | Albert et al. |
| 6,137,467 | A | 10/2000 | Sheridon et al. |
| 6,144,361 | A | 11/2000 | Gordon, II et al. |
| 6,147,791 | A | 11/2000 | Sheridon |
| 6,172,798 | B1 | 1/2001 | Albert et al. |
| 6,184,856 | B1 | 2/2001 | Gordon, II et al. |
| 6,225,971 | B1 | 5/2001 | Gordon, II et al. |
| 6,241,921 | B1 | 6/2001 | Jacobson et al. |
| 6,271,823 | B1 | 8/2001 | Gordon, II et al. |
| 6,301,038 | B1 | 10/2001 | Fitzmaurice et al. |
| 6,664,944 | B1 | 12/2003 | Albert et al. |
| 6,672,921 | B1 | 1/2004 | Liang et al. |
| 6,788,449 | B2 | 9/2004 | Liang et al. |
| 6,864,875 | B2 | 3/2005 | Drzaic et al. |
| 6,866,760 | B2 | 3/2005 | Paolini Jr. et al. |
| 6,870,657 | B1 | 3/2005 | Fitzmaurice et al. |
| 6,922,276 | B2 | 7/2005 | Zhang et al. |
| 6,950,220 | B2 | 9/2005 | Abramson et al. |
| 6,982,178 | B2 | 1/2006 | LeCain et al. |
| 7,002,728 | B2 | 2/2006 | Pullen et al. |
| 7,012,600 | B2 | 3/2006 | Zehner et al. |
| 7,075,502 | B1 | 7/2006 | Drzaic et al. |
| 7,116,318 | B2 | 10/2006 | Amundson et al. |
| 7,167,155 | B1 | 1/2007 | Albert et al. |
| 7,170,670 | B2 | 1/2007 | Webber |
| 7,236,291 | B2 | 6/2007 | Kaga et al. |
| 7,242,543 | B1 | 7/2007 | Yang et al. |
| 7,312,784 | B2 | 12/2007 | Baucom et al. |
| 7,321,459 | B2 | 1/2008 | Masuda et al. |
| 7,339,715 | B2 | 3/2008 | Webber et al. |
| 7,411,719 | B2 | 8/2008 | Paolini, Jr. et al. |
| 7,420,549 | B2 | 9/2008 | Jacobson et al. |
| 7,453,445 | B2 | 11/2008 | Amundson |
| 7,535,624 | B2 | 5/2009 | Amundson et al. |
| 7,573,493 | B2 | 8/2009 | Brown Elliott et al. |
| 7,667,684 | B2 | 2/2010 | Jacobson et al. |
| 7,679,814 | B2 | 3/2010 | Paolini et al. |
| 7,791,789 | B2 | 9/2010 | Albert et al. |
| 7,839,564 | B2 | 11/2010 | Whitesides et al. |
| 7,910,175 | B2 | 3/2011 | Webber et al. |
| 7,952,790 | B2 | 5/2011 | Honeyman et al. |
| 7,956,841 | B2 | 6/2011 | Albert et al. |
| 8,009,348 | B2 | 8/2011 | Zehner et al. |
| 8,054,526 | B2 | 11/2011 | Bouchard |
| 8,154,568 | B2 * | 4/2012 | Chou .......................... 345/695 |
| 8,319,759 | B2 | 11/2012 | Jacobson et al. |
| 8,466,852 | B2 | 6/2013 | Drzaic et al. |
| 2008/0043318 | A1 | 2/2008 | Whitesides et al. |
| 2008/0048970 | A1 | 2/2008 | Drzaic et al. |
| 2009/0004442 | A1 * | 1/2009 | Danner ..................... 428/195.1 |
| 2009/0225398 | A1 | 9/2009 | Duthaler et al. |

OTHER PUBLICATIONS

Hayes, R.A., et al., "Video-Speed Electronic Paper Based on Electrowetting", Nature, vol. 425, Sep. 25, pp. 383-385 (2003).

Kitamura, T., et al., "Electrical toner movement for electronic paper-like display", Asia Display/IDW '01, p. 1517, Paper HCS1-1 (2001).

O'Regan, B. et al., "A Low Cost, High-efficiency Solar Cell Based on Dye-sensitized colloidal TiO2 Films", Nature, vol. 353, Oct. 24, 1991, 773-740.

Wood, D., "An Electrochromic Renaissance?" Information Display, 18(3), 24 (Mar. 2002).

Yamaguchi, Y., et al., "Toner display using insulative particles charged triboelectrically", Asia Display/IDW '01, p. 1729, Paper AMD4-4 (2001).

* cited by examiner

TETRACHROMATIC COLOR FILTER ARRAY FOR REFLECTIVE DISPLAY

BACKGROUND OF INVENTION

This invention relates to electro-optic displays and color filters for use in such displays.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, or luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 14(11), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R. A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in the these patents and applications include:

(a) Electrophoretic particles, fluids and fluid additives; see for example U.S. Pat. Nos. 7,002,728 and 7,679,814;

(b) Capsules, binders and encapsulation processes; see for example U.S. Pat. Nos. 6,922,276 and 7,411,719;

(c) Films and sub-assemblies containing electro-optic materials; see for example U.S. Pat. No. 6,982,178 and U.S. Patent Application 2007/0109219;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. Nos. 6,017,584; 6,664,944; 6,864,875; 7,075,502; 7,167,155; and 7,667,684; and U.S. Patent Applications Publication Nos. 2004/0263947; 2007/0109219; 2007/0223079; 2008/0023332; 2008/0043318; 2008/

0048970; 2008/0211764; 2009/0004442; 2009/0040594; 2009/0225398; and 2009/0237776;

(f) Methods for driving displays; see for example U.S. Pat. Nos. 7,012,600 and 7,453,445;

(g) Applications of displays; see for example U.S. Pat. No. 7,312,784 and U.S. Patent Applications Publication No. 2006/0279527; and (h) Non-electrophoretic displays, as described in U.S. Pat. Nos. 6,241,921; 6,950,220; and 7,420,549; and U.S. Patent Application Publication No. 2009/0046082.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc. Hereinafter, the term "microcavity electrophoretic display" may be used to cover both encapsulated and microcell electrophoretic displays.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

Other types of electro-optic media may also be used in the displays of the present invention.

Many types of electro-optic media are essentially monochrome, in the sense that any given medium has two extreme optical states and a range of gray levels lying between the two extreme optical states. As already indicated, the two extreme optical states need not be black and white. For example, one extreme optical state can be white and the other dark blue, so that the intermediate gray levels will be varying shades of blue, or one extreme optical state can be red and the other blue, so that the intermediate gray levels will be varying shades of purple.

There is today an increasing demand for full color displays, even for small, portable displays; for example, most displays on cellular telephones are today full color. To provide a full color display using monochrome media, it is either necessary to place a color filter array where the display can be viewed through the color filter array, or to place areas of different electro-optic media capable of displaying different colors adjacent one another.

Figure 1:
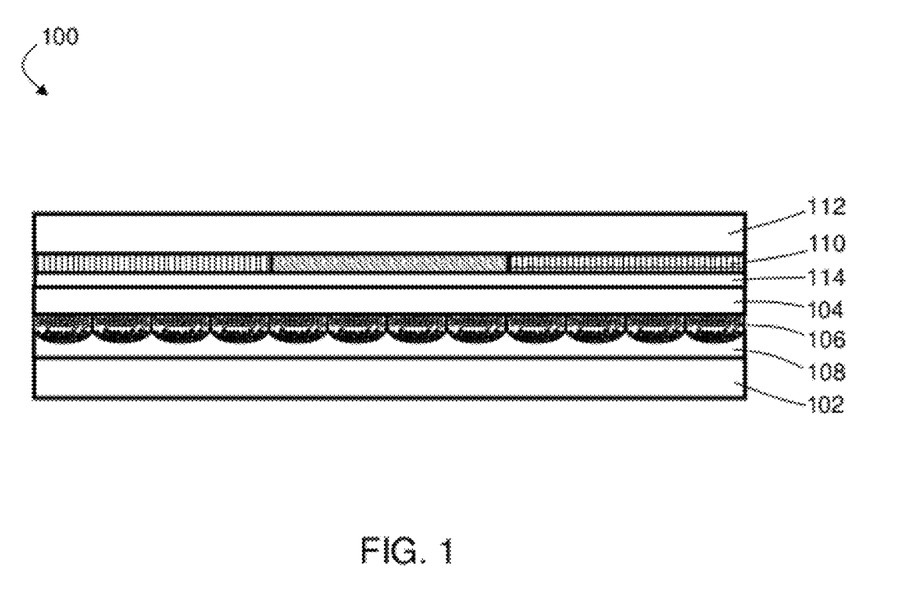

FIG. 1 of the accompanying drawings includes an exemplary schematic section through a color electrophoretic display (generally designated 100) comprising a backplane 102. To this backplane 102 has been laminated an inverted front plane laminate as described in the aforementioned U.S. Pat. No. 6,982,178. The front plane laminate can be formed by coating capsules on a conductive layer (usually indium tin oxide (ITO)) formed on film 104 (e.g., a polyethylene terephthalate film) to form a monochrome electrophoretic medium layer 106 having black and white extreme optical states. In addition, an adhesive layer can be separately coated on a release sheet (not shown) and adhered to the capsule layer to form adhesive layer 108. The release sheet can be removed, and the front plane laminate can be laminated to backplane 102. A color filter array 110 having red, green and blue areas can be separately printed or otherwise formed on substrate 112 (e.g., a glass substrate). The color filter array and substrate can then be adhered to film 104, for example, by depositing adhesive layer 114 on color filter array 110 or film 106.

In the display 100, the electrophoretic layer 106 is of course not 100 percent reflective, and the saturation of the color filter elements in the array 110 must be reduced to allow enough light to pass through the array 110, reflect from the electrophoretic layer 106, and return through the array 110. However, using a color filter array does enable a single black/white electro-optic medium to provide a full color display, and it is typically easier to control the color gamut of a display by varying the colors in a color filter array than by varying the colors of electro-optic media, there being far more materials available for use in color filter arrays than in most electro-optic media.

Figure 2:
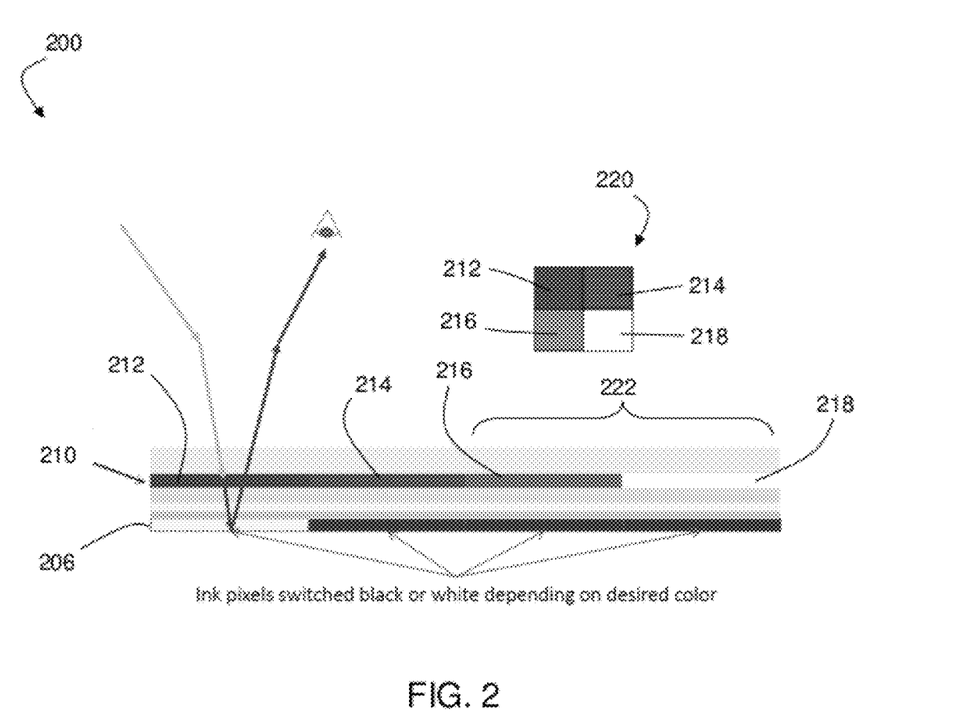

The color filter array shown in FIG. 1 is an RGB color filter. It is known that improved contrast can be obtained from a filter if a white pixel is included, thus producing an RGBW filter. FIG. 2 of the accompanying drawings includes an exemplary illustration of a display (generally designated 200) including one such filter arrangement. In FIG. 2, the electrophoretic medium layer, having extreme black and white optical states, is illustrated as layer 206. The color filter array 210 includes red 212, blue 214, green 216, and white 218 areas aligned with pixel electrodes (not shown). Inset 220 includes a top-side view of region 222 within display 200, which illustrates the layout of a red, blue, green, and white region within a pixel.

Although improvements have been achieved with RGBW color filters, it has been found that when an RGBW filter is used with an electro-optic display and the red, green and blue pixels use reasonably saturated red, green and blue colors, the white state of the display is rather poor. It has been suggested that a CMY (cyan/magenta/yellow) filter, similar to the CMY printing systems used in the color printing industry, be used in place of the RGB filter. In color printing, the cyan, magenta and yellow inks can overlap, so the resultant print can provide well saturated colors using a subtractive color mode. No such overlap is possible in a color filter used with an electro-optic display, because the cyan, magenta and yellow pixels lie alongside each other and do not overlap. It has been found that using a CMYW (cyan/magenta/yellow/white) color filter in place of an RGBW color filter improves the white state of the display but causes red, green and blue colors to look desaturated, i.e., "washed out".

Accordingly, there is a need for improved color filter arrays in electro-optic displays, and this invention seeks to provide such improved color filter arrays, and displays containing such color filters.

SUMMARY OF THE INVENTION

It has now been found that the appearance of color images on electro-optic displays can be improved by using a new set of four primary colors. The result of using the new set of four primary colors is a compromise between the aforementioned properties of RGB and CMY primaries; more specifically, the new set of four primaries produces red, green and blue color saturation greater than that achieved by CMY primaries, while producing a white state better than that achieved with RGB primaries. The resulting properties render color images more attractive to the human eye than those achieved with either RGB or CMY primaries. In one set of embodiments, the four primary colors can be selected as a set of two pairs of hues, P1/P3 and P2/P4. Hue pair P1/P3 and/or hue pair P2/P4 can be selected such that they average to gray.

Accordingly, in one aspect, a color filter array comprising four colors is provided. In some embodiments, the color filter array comprises a plurality of pixels, comprising: a first sub-pixel having a first hue P1 positioned at a first hue angle h1 in the $a^*b^*$ plane of the $La^*b^*$ color space; a second sub-pixel having a second hue P2 positioned at a second hue angle h2 in said $a^*b^*$ plane; a third sub-pixel having a third hue P3 positioned at a third hue angle h3 equal to $h1+(180°\pm10°)$ (i.e., $h1+170°$ to $h1+190°$) in said $a^*b^*$ plane; and a fourth sub-pixel having a fourth hue P4 positioned at a fourth hue angle h4 equal to $h2+(180°\pm10°)$ in said $a^*b^*$ plane.

In some embodiments, the hue pairs can include complementary subtractive/additive color pairs. For example, hue pair P1/P3 and/or hue pair P2/P4 can be selected from, in some cases, red/cyan (R/C), green/magenta (G/M) and/or blue/yellow (B/Y). In some embodiments, hue pairs P1/P3 and P2/P4 can be selected such that one is R/C and the other is G/M; such that one is R/C and the other is B/Y; or such that one is G/M and the other is B/Y.

The line connecting hue P1 to hue P3 and the line connecting hue P2 to hue P4 (as defined in the preceding paragraphs) can meet at an angle close to a right angle, in some embodiments. For example, in some embodiments, a first line connecting hue P1 to hue P3 and a second line connecting hue P2 to hue P4 can intersect within the $a^*b^*$ plane of the $La^*b^*$ color space such that they define angles of not less than about 70°.

Optionally, the line connecting hue P1 to P3 and the line connecting hue P2 to hue P4 can intersect near the origin of the $a^*b^*$ plane of the $La^*b^*$ color space. In some embodiments, the distance from the origin of the $a^*b^*$ plane to the intersection of the lines connecting hue P1 to P3 and hue P2 to hue P4 can be less than about 20% of the shortest of the distances between the origin of the $a^*b^*$ plane and any of hues P1, P2, P3, and P4.

In one set of embodiments, the color filter array comprises a plurality of pixels, comprising: a first sub-pixel having a first hue P1 positioned at a first hue angle h1 in the $a^*b^*$ plane of the $La^*b^*$ color space; a second sub-pixel having a second hue P2 positioned at a second hue angle h2 in said $a^*b^*$ plane; a third sub-pixel having a third hue P3 positioned at a third hue angle h3 equal to $h1+(180°\pm10°)$ in said $a^*b^*$ plane; and a fourth sub-pixel having a fourth hue P4 positioned at a fourth hue angle h4 equal to $h2+(180°\pm10°)$ in said $a^*b^*$ plane, wherein the angle between hue angle h1 and hue angle h2 in said $a^*b^*$ plane is from about 70° to about 110°.

In some embodiments, the hue of each sub-pixel in the color filter array has a $C^*$ value greater than 5 $\Delta E$ units from the origin (where $C^*$ has the conventional meaning of $[(a^*)^2+(b^*)^2]^{0.5}$, i.e., it represents the distance from the origin of the $a^*b^*$ plane).

Also described are electro-optic displays provided with the color filters described herein. This embodiments described herein can be used in such displays having an electro-optic medium which is reflective, such that light passes through the color filter, is reflected from the electro-optic medium, and passes back through the color filter to an observer. The electro-optic display may make use of any of the types of electro-optic medium discussed above. Thus, the electro-optic material may comprise a rotating bichromal member or electrochromic material. Alternatively, the electro-optic material may comprise an electrophoretic material comprising a plurality of electrically charged particles disposed in a fluid and capable of moving through the fluid under the influence of an electric field. The electrically charged particles and the fluid may be confined with a plurality of capsules or microcells. Alternatively, the electrically charged particles and the fluid may be present as a plurality of discrete droplets surrounded by a continuous phase comprising a polymeric material. The fluid may be liquid or gaseous.

The embodiments described herein can be used as part of an electronic book reader, portable computer, tablet computer, cellular telephone, smart card, sign, watch, shelf label, and/or flash drive comprising a display.

In some embodiments, it is desirable to convert RGB image data for use with the inventive color filters described herein. Accordingly, a method of converting an RGB image for display on the inventive displays described herein is provided.

BRIEF DESCRIPTION OF THE DRAWINGS

As already mentioned, FIG. 1 of the accompanying drawings comprises an exemplary schematic section through a color electrophoretic display.

As already mentioned, FIG. 2 of the accompanying drawings comprises an exemplary schematic section through a color electrophoretic display comprising an RGBW color filter.

DETAILED DESCRIPTION

As previously mentioned, color filter arrays comprising four primary colors are provided. Also provided are electro-optic displays using such color filter arrays.

The color filter arrays described herein can be produced by selecting four primary color hues, referred to as P1, P2, P3, and P4 herein. Hues P1-P4 can include two pairs of hues: a first hue pair P1 and P3 (i.e., P1/P3), and a second hue pair P2 and P4 (i.e., P2/P4). In some embodiments, hues P1-P4 can be selected such that each pair of hues averages to a neutral gray. For example, the combination of hues P1 and P3 and/or the combination of hues P2 and P4 can average to gray. Such an effect can be achieved by selecting hues with certain positions on the a*b* plane of the La*b* color space.

Figure 3A:
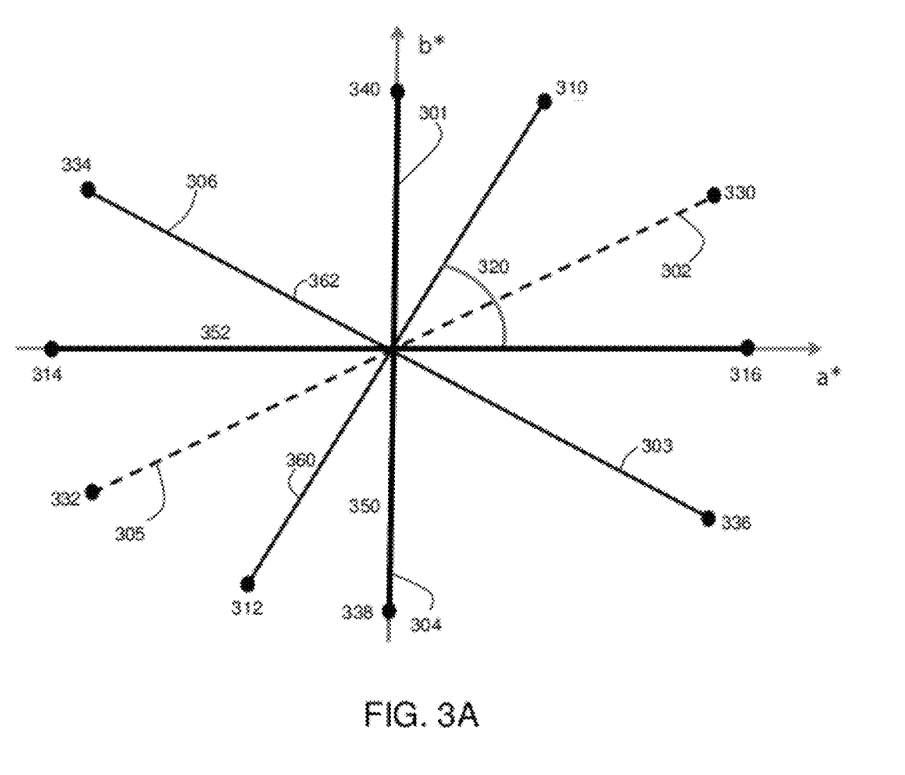
FIGS. 3A-3B comprises exemplary plots of the a*b* plane in the La*b* color space, including exemplary hues that can be used in association with some of the embodiments described herein.
Figure 3B:
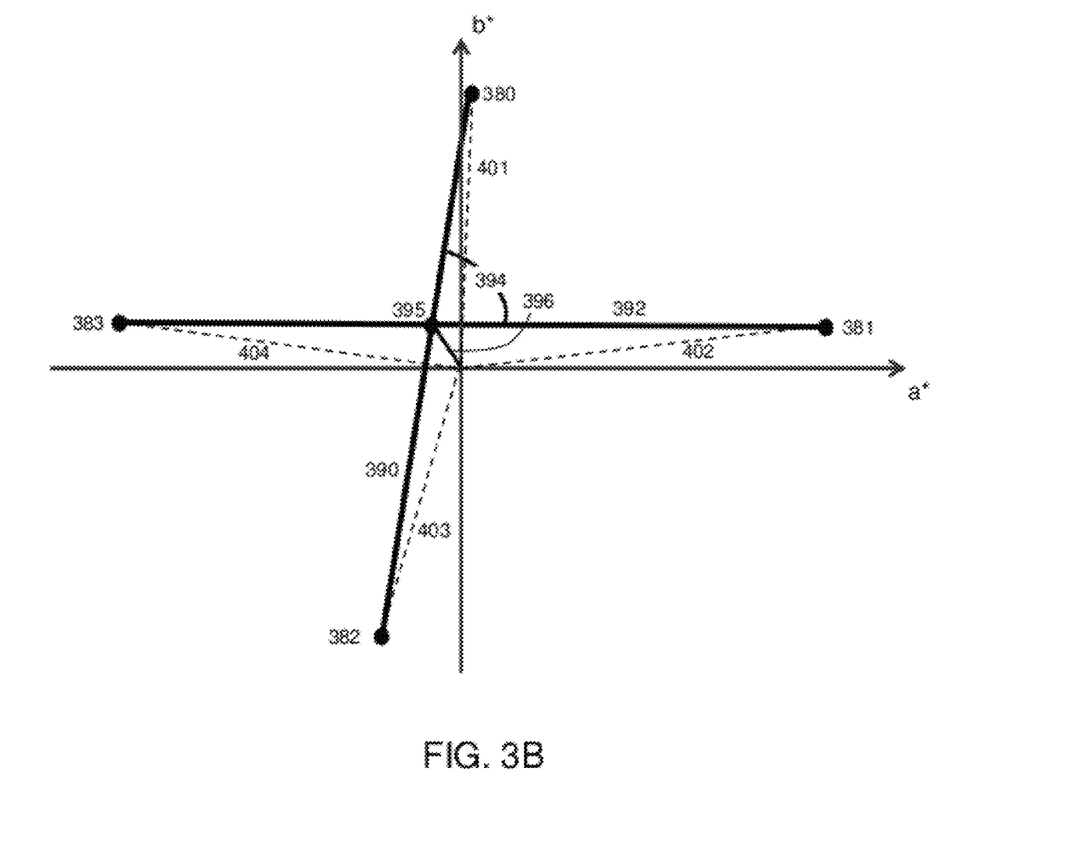

FIGS. 3A-3B include exemplary plots of the a*b* plane in the La*b* color space, which can be used to illustrate the selection of hues appropriate for use in various embodiments described herein. As used herein, "La*b* color space" refers to the color coordinate system specified in 1976 by the CIE (Commission Internationale de l'Eclairage, International Commission on Illumination, Vienna, Austria, www.cie.co.at) and described in R. W. G. Hunt, The Reproduction of Colour, Fountain Press, Tolworth, England 1988, pp 114-123. Briefly, the La*b* color space includes three coordinates: L, a*, and b*. The position along the L coordinate indicates the lightness of the color, with L=0 corresponding to black and L=100 corresponding to diffuse white. The position along the a* coordinate indicates the position of the color between extremes of red/magenta and cyan/green, with negative values of a* corresponding to relatively cyan/green colors and positive values of a* corresponding to relatively red/magenta colors. Finally, the position along the b* coordinate indicates the position of the color between extremes of blue and yellow, with negative values of b* corresponding to relatively blue colors and positive values of b* corresponding to relatively yellow colors. In FIG. 3A, the relative amount of yellow in a hue increases in a direction away from the origin along line 301, the relative amount of red in a hue increases in a direction away from the origin along line 302, relative amount of magenta in a hue increases in a direction away from the origin along line 303. In addition, the relative amount of blue in a hue increases in a direction away from the origin along line 304, the relative amount of cyan in a hue increases in a direction away from the origin along line 305, and the relative amount of green in a hue increases in a direction away from the origin along line 306.

As mentioned above, the hues within hue pair P1/P3 (and/or hue pair P2/P4) can be selected such that the pair of hues averages to gray. This effect can be achieved by selecting hues with certain hue angles. As used herein, a "hue angle" is determined by plotting the a* and b* coordinates on the a*b* plane, and calculating the angle between the positive a* axis and the line connecting the plotted coordinate and the origin. The hue angle is calculated by tracing the angle in a counter-clockwise direction when the a* axis is oriented such that it points to the right and the b* axis is oriented such that it points upward. For example, referring to FIG. 3A, hue 310 has a hue angle of about 60°, as indicated by angle 320.

A pair of hues can average to gray when their hue angles are spaced about 180° apart from each other on the a*b* plane of the La*b* color space. For example, in FIG. 3A, the hues positioned at point 310 (with a hue angle of about 60°) and point 312 (with a hue angle of about 240°) have hue angles spaced about 180° apart from each other on the a*b* plane. Accordingly, the hues corresponding to points 310 and 312 would average to gray. As another example, the hues positioned at point 314 (with a hue angle of about 180°) and point 316 (with a hue angle of about 0°) have hue angles spaced about 180° apart from each other on the a*b* plane. Accordingly, the hues corresponding to points 314 and 316 would average to gray.

In some embodiments, the four primary colors in the color filter array can be selected such that they include two hue pairs, each hue pair including hues with hue angles that are spaced about 180° apart from each other on the a*b* plane. For example, in some embodiments, the first hue pair (e.g., P1/P3) can include hues corresponding to points 310 and 312, while the second hue pair (e.g., P2/P4) can include hues corresponding to points 314 and 316.

In addition to hue pair 310/312 and hue pair 314/316 in FIG. 3A, a variety of other hue pairs can be selected in which the hues average to gray (e.g., for use as hue pair P1/P3 and/or P2/P4). For example, red and cyan, illustrated by points 330 and 332, respectively, have hue angles that are spaced about 180° apart from each other. In addition, green and magenta, illustrated by points 334 and 336, respectively, have hue angles that are spaced about 180° apart from each other. As yet another example, blue and yellow, illustrated by points 338 and 340, respectively, have hue angles that are spaced about 180° apart from each other. In some embodiments, hue pair P1/P3 and/or hue pair P2/P4 can include red/cyan (R/C), green/magenta (G/M) and/or blue/yellow (B/Y). Thus, in some embodiments, hue pairs P1/P3 and P2/P4 can be selected such that one is R/C and the other is G/M; such that one is R/C and the other is B/Y; or such that one is G/M and the other is B/Y.

It should be understood that the hue angles of the hues within a hue pair do not have to be spaced exactly 180° apart. For example, a hue pair (e.g., hue pair P1/P3 and/or hue pair P2/P4) can include hues with hue angles that are spaced about 180°±10°, about 180°±5°, about 180°±2°, or about 180°±1° apart from each other.

In some embodiments, hues P1, P2, P3, and P4 can be selected such that the line connecting P1 to P3 and the line connecting P2 to P4 intersect to form an angle close to a right angle. For example, referring to FIG. 3A, the hue corresponding to point 338 can be chosen as P1 and the hue corresponding to point 340 can be chosen as P3. In addition, the hue corresponding to point 314 can be chosen for P2, and the hue corresponding to point 316 can be chosen for P4. In this set of embodiments, line 350 (which connects 338 to 340) and line 352 (which connects 314 to 316) intersect to form an angle of about 90°. As another example, the hue corresponding to point 310 can be chosen as P1, the hue corresponding to point 336 can be chosen as P2, the hue corresponding to point 312 can be chosen as P3, and the hue corresponding to point 334 can be chosen as P4. In this set of embodiments, line 360 (which connects 310 to 312) and line 362 (which connects 334 top 336) intersect to form an angle of about 90°.

It should be understood that the angle defined by the lines connecting P1 to P3 and P2 to P4 do not have to form an angle of exactly 90°. For example, in some embodiments, a first line connecting hue P1 to hue P3 and a second line connecting hue P2 to hue P4 can intersect within the a*b* plane of the La*b* color space such that they define angles of no less than about 70°, no less than about 80°, no less than about 85°, no less than about 89°, no less than about 89.5°, or no less than about 89.9°. In some embodiments, the intersection of a first line connecting hue P1 to hue P3 and a second line connecting hue P2 to hue P4 within the a*b* plane of the La*b* color space can define an angle from about 70° to about 110°, from about 80° to about 100°, from about 85° to about 95°, from about 89° to about 91°, from about 89.5° to about 90.5°, or from about 89.9° to about 90.1°. Referring to FIG. 3B, for example, P1 can be chosen to correspond to point 380, P2 can be chosen to correspond to point 381, P3 can be chosen to correspond to point 382, and P4 can be chosen to correspond to point 383. In the set of embodiments illustrated in FIG. 3B, line 390 (joining 380 to 382) and line 392 (joining 381 to 383) form a smallest angle (as indicated by angle 394) of about 80°. In some embodiments, a suitable angle at the intersection of the line connecting P1 to P3 and the line connecting P2 to P4 can be achieved when the hue angle between P1 and P2 is from about 70° to about 110°, from about 80° to about 100°, from about 85° to about 95°, from about 88° to about 92°, or from about 89° to about 91°.

In some embodiments, the line connecting hue P1 to P3 and the line connecting hue P2 to hue P4 can intersect near the origin of the a*b* plane of the La*b* color space. For example, in the set of embodiments illustrated in FIG. 3A, lines 350 and 352 intersect at the origin of the a*b* plane. In addition, line 360 and line 362 also intersect at the origin of the a*b* plane. It should be understood, however, that in some embodiments, the lines might not intersect exactly at the origin of the a*b* plane. For example, in the set of embodiments illustrated in FIG. 3B, line 390 and line 392 intersect at point 395, which lies a distance 396 away from the origin of the a*b* plane. In some embodiments, the distance from the origin of the a*b* plane to the intersection of the lines connecting hue P1 to P3 and hue P2 to hue P4 (e.g., distance 396 in FIG. 3B) can be less than about 20%, less than about 10%, less than about 5%, less than about 2%, or less than about 1% of the shortest of the distances between the origin of the a*b* plane and any of hues P1, P2, P3, and P4 (e.g., dotted lines 401, 402, 403, and 404 in FIG. 3B). For example, in the set of embodiments illustrated in FIG. 3B, dotted lines 401, 402, 403, and 404 represent the distances between the origin and points 380, 381, 382, and 383, respectively. In FIG. 3B, distance 396 is less than about 20% of the length of dotted line 403, which is the shortest of dotted lines 401, 402, 403, and 404.

In some embodiments, each hue in the color filter array has a minimum saturation. The saturation of a hue within a sub-pixel can be determined by switching all other sub-pixels to black, and measuring the C* value of the sub-pixel that is not switched to black, wherein C* is calculated as:

$$C^* = \sqrt{(a^*)^2 + (b^*)^2} \quad [1]$$

In some embodiments, each sub-pixel can have a C* value that is greater than 5 ΔE units from the origin as measured when the other sub-pixels are switched to black. One of ordinary skill in the art would be capable of determining the ΔE value for a given hue.

Figure 4A:
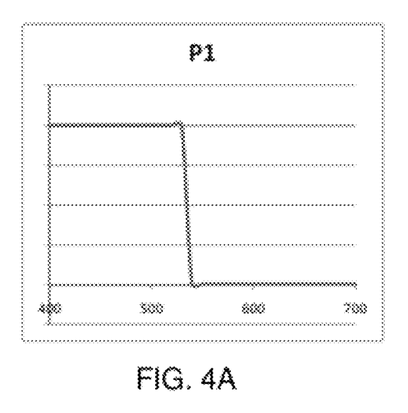
FIGS. 4A-4D comprise exemplary spectra of hues that can be used in some of the embodiments described herein.
Figure 4B:
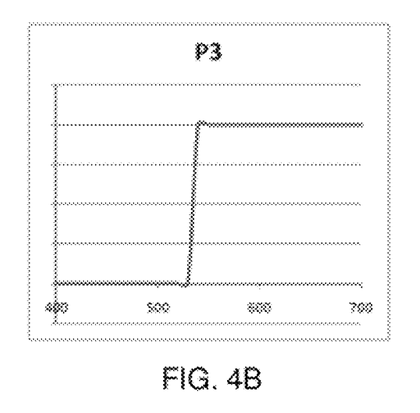

In one set of embodiments, the spectrum of the P1/P3 hue pair can be achieved using a low-pass and a high-pass filter in the visible region of the electromagnetic spectrum (i.e., radiation of wavelengths approximately 400-700 nm). In some embodiments, the cut-off wavelength of the low-pass and/or high-pass filter used for the P1 and P3 hues can be located between about 500 nm and about 600 nm, between about 520 nm about 570 nm, or between about 530 nm and about 540 nm. FIG. 4A includes an exemplary plot of transmittance as a function of wavelength for an exemplary low-pass filter that can be used for P1, according to some embodiments. FIG. 4B includes an exemplary plot of transmittance as a function of wavelength for an exemplary high-pass filter that can be used for P3, according to one set of embodiments. In this case, the cut-off wavelength for each of the filters illustrated in FIGS. 4A and 4B is about 535 nm. The P1/P3 pair illustrated in FIGS. 4A-4B, which bisects the visible spectrum in the mid-green region, does not correspond to any complementary pair of the tristimulus primary colors.

Figure 4C:
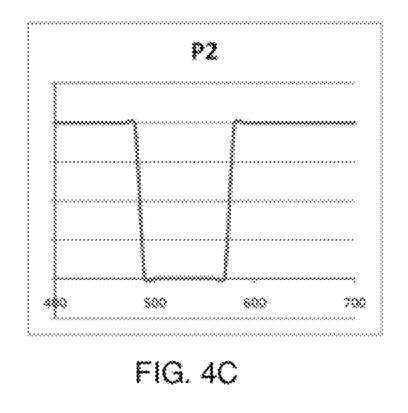
Figure 4D:
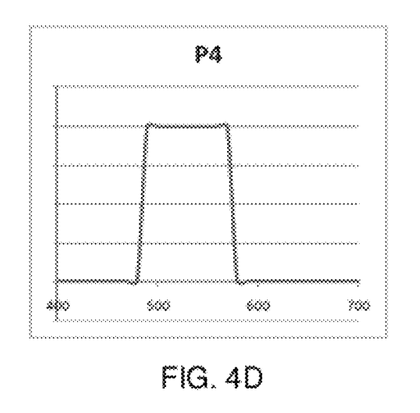

The spectrum of the P2/P4 hue pair can be achieved using bandpass filters, in some embodiments. In one set of embodiments, the spectrum of P2 can be created using a single bandpass filter with a passband near the center of the visible spectrum (e.g., between about 490 nm and about 570 nm). FIG. 4C includes a plot of transmittance as a function of wavelength for such an exemplary P2 filter. In some cases, the spectrum of P4 can be created using a dual bandpass filter with complementary passbands (e.g., one between about 400 nm and about 490 nm and the other between about 570 nm and about 700 nm). FIG. 4D includes a plot of transmittance as a function of wavelength for such an exemplary P4 filter. The filter behavior illustrated in FIGS. 4C-4D is similar to the green/magenta pair of the tristimulus primary colors. Exemplary commercially-available filters that correspond to the representative ideal spectra illustrated in FIGS. 4A-4D include, for example, filter 768 for FIG. 4A (egg yolk yellow), filter M56 for FIG. 4C (magenta 6), filter B06 for FIG. 4B (lagoon 6), and filter 738 for FIG. 4D (Jas green), each of which is available from Lee Filters, Andover, Hampshire, UK.

Figure 5A:
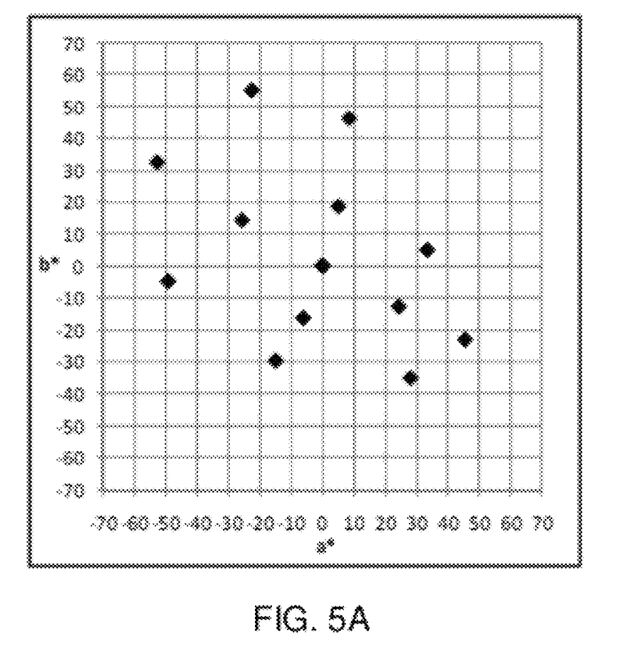
FIGS. 5A-5D comprise (A) an exemplary projection of the color gamut in the a*b* plane for a color filter array with the spectra illustrated in FIGS. 4A-4D, (B) an exemplary plot of color saturation plotted against the lightness of that color for a color filter array with the spectra illustrated in FIGS. 4A-4D, (C) an exemplary projection of the color gamut in the a*b* plane for an idealized RGBW color filter array, and (D) an exemplary plot of color saturation plotted against the lightness of that color for an idealized RGBW color filter array.
Figure 5B:
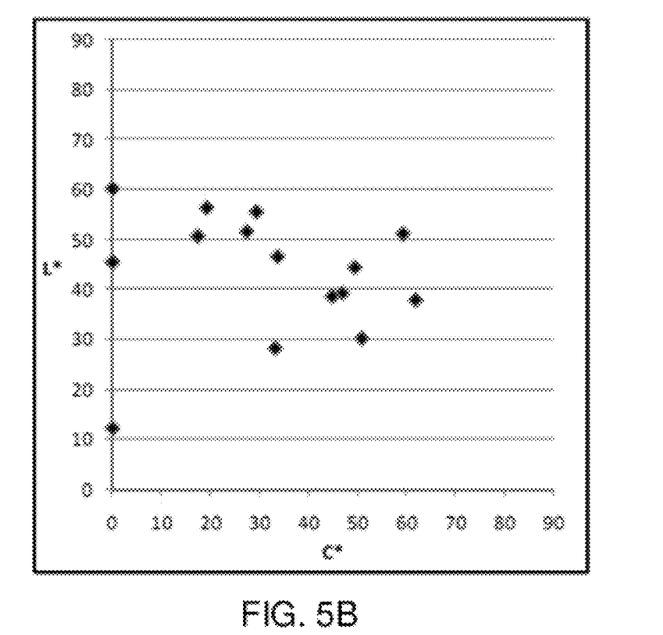
Figure 5C:
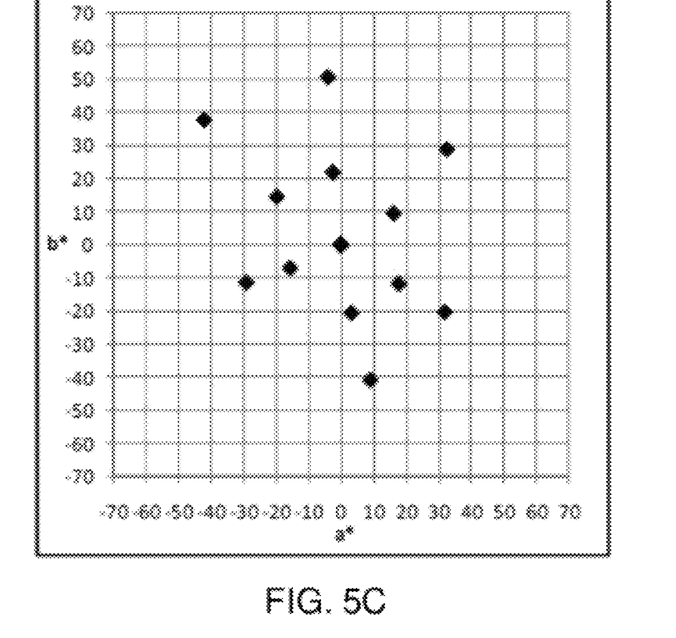
Figure 5D:
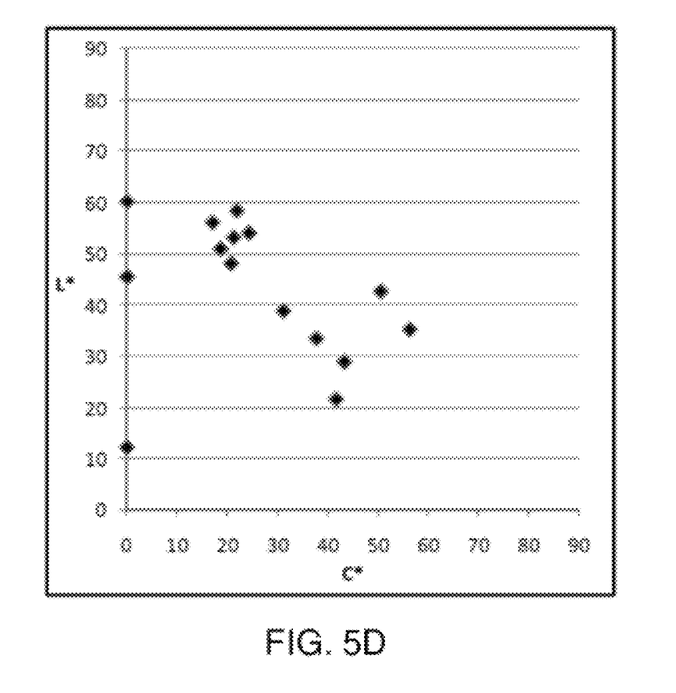

FIGS. 5A-5B include plots of a modeled color gamut available from a color filter array according to the embodiments described herein, using the ideal spectra illustrated in FIGS. 4A-4D, located above an electrophoretic ink with a white state reflectivity of 57% and a contrast ratio of 20:1. In generating the plots in FIGS. 5A-5B, all other light losses were ignored, to produce a relatively simple model. Two views of the color gamut are shown in FIGS. 5A and 5B. FIG. 5A includes a projection of the color gamut in the a*b* plane, while FIG. 5B illustrates the color saturation plotted against the lightness of that color. For comparison, similar plots for an idealized RGBW color gamut (using the same assumptions used to generate FIGS. 5A-5B) are shown in FIGS. 5C-5D. The overall volume of the color gamut using the color filter array produced using the filters in FIGS. 4A-4D is about 25% larger than the volume of the color gamut produced using the conventional RGBW color filter array. In addition, upon comparing FIG. 5B with FIG. 5D, one can see that the colors obtained using the color filter array including the filters in FIGS. 4A-4D are brighter (higher in L*) for a given saturation (C*), relative to the colors obtained using the idealized RGBW color filter array.

Figure 6:
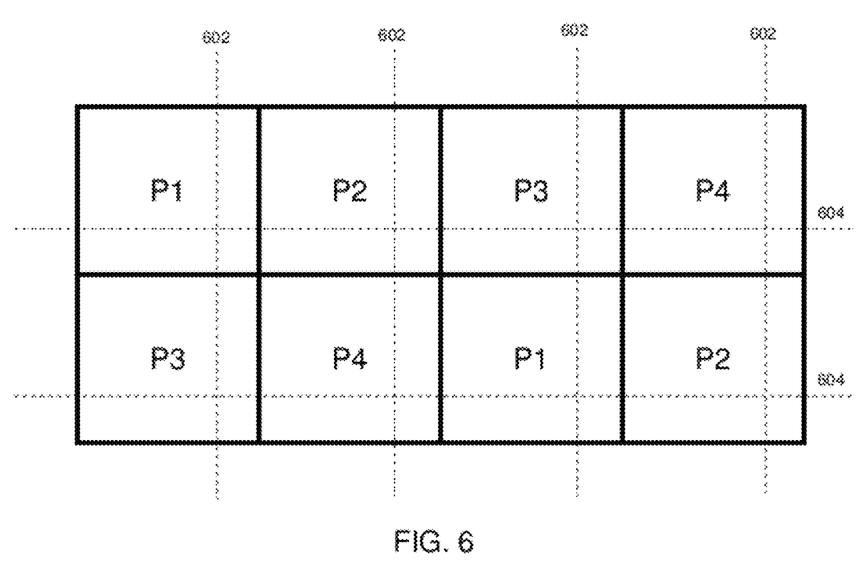
FIG. 6 comprises an exemplary schematic diagram illustrating the layout of sub-pixels, according to one set of embodiments.

In some embodiments, the sub-pixels of the color filter array can be arranged such that the average color along a line that cross a row or column of sub-pixels is gray. This can be achieved, for example, by arranging the sub-pixels such that, along a row or column (or a plurality of rows or columns, or across substantially all rows and columns), the number of P1 sub-pixels is within 5% of, within 2% of, within 1% of, or substantially the same as the number of P3 sub-pixels and/or the number of P2 sub-pixels is within 5% of, within 2% of, within 1% of, or substantially the same as the number of P4 sub-pixels. FIG. 6 includes a schematic top-view of one such color filter array, including an exemplary layout of the sub-pixels. In this layout, each of the vertical lines 602 and each of the horizontal lines 604 passes through the same amount of P1 sub-pixels as P3 sub-pixels, and the same amount of P2 sub-pixels as P4 sub-pixels. Accordingly, each of the vertical and horizontal lines in the color array of FIG. 6 averages to 50% gray.

Figure 7:
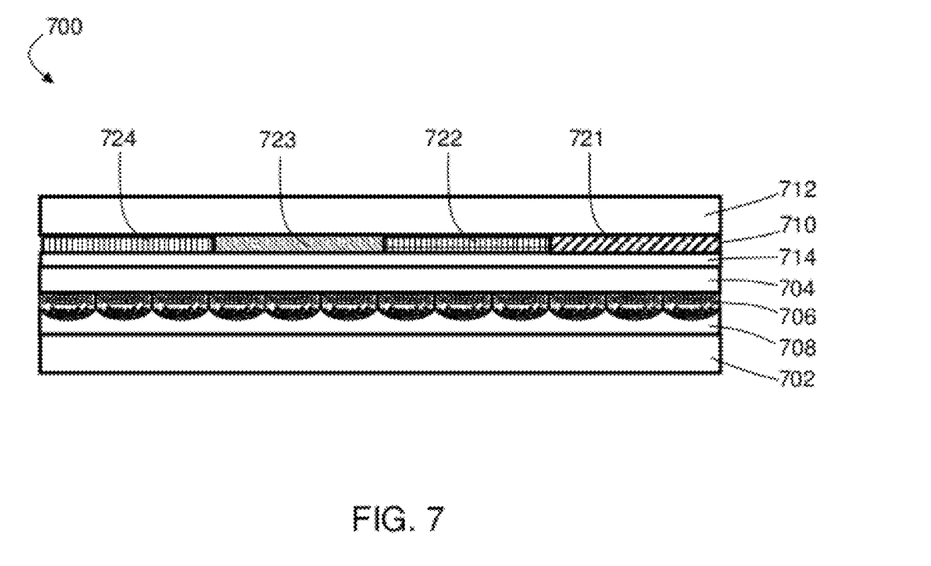
FIG. 7 comprises, according to one set of embodiments, an exemplary schematic section through a color electrophoretic display comprising a tetrachromatic color filter array.

FIG. 7 of the accompanying drawings includes an exemplary schematic section through a color electrophoretic display (generally designated 700) comprising a tetrachromatic color filter array, according to one set of embodiments. The display of FIG. 7 includes a backplane 702. An inverted front plane laminate, as described in the aforementioned U.S. Pat. No. 7,839,564, can be laminated onto backplane 702 in some embodiments. The inverted front plane laminate can comprise a monochrome electrophoretic medium layer 706 having black and white extreme optical states supported by a conductive layer (e.g., indium tin oxide) on film 704 (e.g., a polyethylene terephthalate film) and adhered to backplane 702 via adhesive layer 708. A tetrachromatic color filter array 710 having four primary color areas 721 (which can correspond, for example, to P1), 722 (e.g., P2), 723 (e.g., P3), and 724 (e.g., P4) can be printed or otherwise formed on substrate 712 (e.g., a glass substrate). The color filter array and substrate can then be adhered to film 104, for example, by depositing adhesive layer 714 on color filter array 710 or film 706.

Conversion of RGB image data for use with the inventive color filters described herein can be desirable. As described above, in some embodiments, the color filter array can include four hues (P1, P2, P3, and P4), which can be grouped into two hue pairs, P1/P3 and P2/P4, each of which averages to gray. In addition, in some embodiments, the angles between hue angles h1 and h3 and between hue angles h2 and h4 can be close to 90 degrees. Such a set of hues can be described as "opponent." An opponent color space can consists of 3 pairs of opponent components, one luminance component ($O_1$), and 2 chrominance components ($O_2$, $O_3$).

A simple transformation exists from trichromatic input space such as RGB to the opponent color space ($O_1$, $O_2$, $O_3$). If the display primaries qualify as opponent primaries (i.e., if each pair can be combined to neutral, and the hue angle between the axes connecting each pair is sufficiently orthogonal), a simple and unique transformation can be made from the trichromatic input color space to the opponent display color space. This is possible because the transformation into the opponent color space reduces the dimensionality of the chrominance component, for example from 3-D (RGB) to 2-D ($O_2$, $O_3$). One basic example of such a transformation for R/G, B/Y follows.

If $O_2$ is the red-green channel, $O_2 = G - R$, and if $O_3$ is the blue-yellow channel, $O_3 = B - Y = B - (R+G)$.

For an arbitrary set of opponent primaries, such as P1/P4 and P2/P3, the RGB input data should first be transformed into device-independent XYZ data, after which, the transformation from XYZ to any opponent color space takes the form:

$$O_2 = P1 - P4, \; O_3 = P2 - P3 \quad [2]$$

$$\begin{bmatrix} O_1 \\ O_2 \\ O_3 \end{bmatrix} = M \begin{bmatrix} X \\ Y \\ Z \end{bmatrix} \quad [3]$$

with M being a 3×3 transformation matrix for which the coefficients have to be determined.

Compared to colorimetric transformation and spectral matching, the opponent processing provides a unique and computationally inexpensive transformation from trichromatic input to the opponent display space.

All patents and patent publications mentioned herein are incorporated herein by reference in their entirety for all purposes.

It will be apparent to those skilled in the art that numerous changes and modifications of the specific embodiments of the invention described above are possible. Accordingly, the foregoing description is to be construed in an illustrative and not in a limitative sense, the invention being defined by the appended claims.

The invention claimed is:

1. A color filter array comprising a plurality of pixels, each pixel comprising:
    a first sub-pixel having a first hue P1 positioned at a first hue angle h1 in the a*b* plane of the La*b* color space;
    a second sub-pixel having a second hue P2 positioned at a second hue angle h2 in said a*b* plane;
    a third sub-pixel having a third hue P3 positioned at a third hue angle h3 equal to h1+(180°±10°) in said a*b* plane; and
    a fourth sub-pixel having a fourth hue P4 positioned at a fourth hue angle h4 equal to h2+(180°±10°) in said a*b* plane.

2. A color filter according to claim 1 wherein said third hue angle h3 is equal to h1+(180°±5°) and said fourth hue angle h4 equal to h2+(180°±5°) in said a*b* plane.

3. A color filter according to claim 2 wherein said third hue angle h3 is equal to h1+(180°±2°) and said fourth hue angle h4 equal to h2+(180°±2°) in said a*b* plane.

4. A color filter array according to claim 1 wherein hue pairs P1/P3 and P2/P4 are selected from red/cyan, green/magenta and blue/yellow.

5. A color filter array according to claim 1 wherein a first line connecting hue P1 to hue P3 and a second line connecting hue P2 to hue P4 intersect within the a*b* plane of the La*b* color space so as to define angles of not less than about 70°.

6. A color filter array according to claim 5 wherein said first and second lines define angles of not less than about 80°.

7. A color filter array according to claim 6 wherein said first and second lines define angles of not less than about 85°.

8. A color filter array according to claim 1 wherein the line connecting hue P1 to P3 and the line connecting hue P2 to hue P4 intersect near the origin of the a*b* plane of the La*b* color space such that the distance from the origin of the a*b* plane to said intersection is less than about 20% of the shortest of the distances from the origin of the a*b* plane to any one of hues P1, P2, P3, and P4.

9. A color filter array according to claim 1 wherein the angle between hue angle h1 and hue angle h2 in said a*b* plane is from about 70° to about 110°.

10. A color filter array according to claim 1 wherein the hue of each sub-pixel in the color filter array has a C* value greater than 5 ΔE units from the origin of the a*b* plane.

11. An electro-optic display comprising a color filter according to claim 1, a layer of electro-optic material disposed adjacent the color filter capable of changing its optical state upon application of an electric field thereto, and at least one electrode arranged to apply an electric field to the layer of electro-optic material.

12. An electro-optic display according to claim 11 wherein the electro-optic material comprises a rotating bichromal member or electrochromic material.

13. An electro-optic display according to claim 11 wherein the electro-optic material comprises an electrophoretic material comprising a plurality of electrically charged particles disposed in a fluid and capable of moving through the fluid under the influence of an electric field.

14. An electro-optic display according to claim 13 wherein the electrically charged particles and the fluid are confined with a plurality of capsules or micro cells.

15. An electro-optic display according to claim 13 wherein the electrically charged particles and the fluid are present as a plurality of discrete droplets surrounded by a continuous phase comprising a polymeric material.

16. An electro-optic display according to claim 13 wherein the fluid is gaseous.

17. An electronic book reader, portable computer, tablet computer, cellular telephone, smart card, sign, watch, shelf label, and/or flash drive comprising a display according to claim 11.

18. A color filter array according to claim 1 which contains only sub-pixels of said first, second, third and fourth hues.

* * * * *